US012686576B2

(12) United States Patent     (10) Patent No.:   US 12,686,576 B2

Leum et al.     (45) Date of Patent:   Jul. 21, 2026

(54) ADJUSTABLE MOBILE LOADING DOCK

(71) Applicant: Leum Engineering, Inc., Minnetonka, MN (US)

(72) Inventors: Grant Leum, Excelsior, MN (US); Eric Demerath, Shepherd, MI (US); Nick Benz, Hopkins, MN (US)

(73) Assignee: Leum Engineering, Inc., Hopkins, MN (US)

( * ) Notice: Subject to any disclaimer, the term of this patent is extended or adjusted under 35 U.S.C. 154(b) by 812 days.

(21) Appl. No.: 17/902,510

(22) Filed: Sep. 2, 2022

(65) Prior Publication Data

US 2024/0076145 A1     Mar. 7, 2024

(51) Int. Cl.
   B65G 69/28     (2006.01)
   B65G 69/00     (2006.01)
   B65G 69/30     (2006.01)

(52) U.S. Cl.
   CPC ........... B65G 69/006 (2013.01); B65G 69/30 (2013.01)

(58) Field of Classification Search
None
See application file for complete search history.

(56) References Cited

U.S. PATENT DOCUMENTS

| | | | | | |
|---|---|---|---|---|---|
| 963,918 | A | * | 7/1910 | Miller | .................... B65G 69/30 |
| | | | | | 193/41 |
| 1,167,672 | A | * | 1/1916 | Barry | ...................... F16C 23/02 |
| | | | | | 384/258 |

| | | | | | |
|---|---|---|---|---|---|
| 1,258,776 | A | * | 3/1918 | Jenkins | .................. B65G 69/30 |
| | | | | | 193/41 |
| 2,199,097 | A | * | 4/1940 | Chappelle | ................. B60P 1/52 |
| | | | | | 414/535 |
| 2,670,484 | A | * | 3/1954 | Bintliff | .................. B65G 69/30 |
| | | | | | 14/72.5 |
| 2,904,802 | A | * | 9/1959 | Hartman | ............ B65G 69/2852 |
| | | | | | 14/71.3 |

(Continued)

FOREIGN PATENT DOCUMENTS

| | | | |
|---|---|---|---|
| CA | 3182096 | | 3/2024 |
| FR | 2453781 | A1 * | 11/1980 |

OTHER PUBLICATIONS

Screen grab from weblink: https://diy.stackexchange.com/questions/145512/what-is-the-name-of-a-headless-bolt (Year: 2018).*

(Continued)

*Primary Examiner* — Christopher J Sebesta
*Assistant Examiner* — Katherine J Chu
(74) *Attorney, Agent, or Firm* — Schwegman Lundberg & Woessner, P.A.

(57) ABSTRACT

A modular loading dock for placement on a grade, the loading dock including a mobile base having four adjustable leg members, each adjustable leg member including two adjustable feet which contact and conform to the grade, the four leg members defining a top opening to receive a dock leveler into such opening. The modular loading dock may also include two pairs of opposing adjustable plates, each pair of opposing adjustable plates being connected between the two adjustable feet on two adjacent adjustable leg members such that each adjustable leg member is connected to only one pair of opposing adjustable plates.

7 Claims, 6 Drawing Sheets

(56)                References Cited

U.S. PATENT DOCUMENTS

| | | | | |
|---|---|---|---|---|
| 4,069,893 | A * | 1/1978 | Blackstone | E06C 7/44 |
| | | | | 182/200 |
| 4,624,446 | A | 11/1986 | Gould | |
| 4,640,385 | A * | 2/1987 | Underhill | E04G 1/32 |
| | | | | 182/113 |
| 4,744,441 | A * | 5/1988 | Sandstrom | E06C 7/46 |
| | | | | 182/201 |
| 4,765,792 | A | 8/1988 | Cherry et al. | |
| 4,926,700 | A * | 5/1990 | Peplinski | B25B 23/14 |
| | | | | 73/761 |
| 5,110,250 | A * | 5/1992 | Kuo | B65G 69/30 |
| | | | | 414/229 |
| 5,154,257 | A * | 10/1992 | Mirles | E06C 7/44 |
| | | | | 182/201 |
| 5,845,356 | A * | 12/1998 | Kielinski | B65G 69/30 |
| | | | | 14/69.5 |
| 6,368,043 | B1 | 4/2002 | Leum et al. | |
| 6,923,615 | B2 * | 8/2005 | Crinion | F03D 15/10 |
| | | | | 415/4.1 |
| 6,957,463 | B2 * | 10/2005 | Falwell | A61G 7/075 |
| | | | | 5/648 |
| 9,675,177 | B1 * | 6/2017 | Letourneau | A47C 3/40 |
| 10,800,619 | B2 * | 10/2020 | Ramos | E01D 15/24 |
| 2005/0044645 | A1 | 3/2005 | Gleason | |
| 2006/0201746 | A1 * | 9/2006 | Jackson | E06C 7/44 |
| | | | | 182/204 |
| 2020/0317455 | A1 | 10/2020 | Leum et al. | |

OTHER PUBLICATIONS

"Mexican Application Serial No. MX a 2022 015101, Office Action mailed Aug. 13, 2025", W Machine English Translation, 17 pgs.
"Canadian Application Serial No. 3182096, Examiners Rule 86(2) Report mailed Aug. 21, 2025", 4 pgs.
"Canadian Application Serial No. 3, 182,096, Office Action mailed May 31, 2024", 6 pgs.
"Canadian Application Serial No. 3,182,096, Response filed Sep. 30, 2024 to Office Action mailed May 31, 2024", 14 pgs.

* cited by examiner

ADJUSTABLE MOBILE LOADING DOCK

FIELD OF THE INVENTION

This invention relates to a mobile loading dock and more particularly to a loading dock which is modular, easily moveable and which has adjustable feet.

BACKGROUND OF THE INVENTION

A variety of dock levelers both with and without surrounding structural frames have been devised to adjust the height of different trailers to properly match the deck of the trailer to the height of the dock. By aligning the height of the trailer and the dock the loading and unloading of cargo is facilitated.

One such device is seen in U.S. Pat. No. 4,624,446 to Gould which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock.

A similar device is disclosed in U.S. Pat. No. 4,765,792 to Cherry, et al. which also discloses a pivotally-mounted and hydraulically-raised platform. In addition to the disclosure of Gould, the device includes mounting the hydraulics inwardly from the non-mounted end of the platform and an aperture in the non-mounted end of the platform to accommodate a truck restraining device.

Another design is disclosed in U.S. Pat. No. 6,368,043 to Leum, et al. which teaches a low-profile truck leveler. In this design a low-profile leveler is enabled through the use of a raised rear beam and two lateral beams that extend above the upper surface of the platform. In addition, a central beam adds further to the leveler's strength and rigidity.

Some dock levelers of the prior art include surrounding frame structure, however, none of these levelers include the leveler being integrated into a frame which is modular, impactable and highly adjustable for added safety. It is to this need that this invention is drawn.

This device overcomes certain problems and shortcomings in the prior art, including those mentioned above and others, and provides advantages for a dock leveler integrated into a modular, impactable and highly-adjustable frame not previously provided.

OBJECTS OF THE INVENTION

It is an object of this invention to provide a mobile loading dock which is modular and able to be easily assembled and disassembled without the need for concrete construction and which can be easily adjustable to conform to the grade.

Another object of this invention is to provide such a mobile loading dock which integrates conventional loading dock levelers.

Yet another object of this invention is to provide a mobile loading dock which is able to be moved easily from one location to another location.

These and other objects of the invention will be apparent from the following descriptions and from the drawings.

SUMMARY OF THE INVENTION

In a preferred embodiment of the present invention a modular loading dock includes a mobile, base with two, opposing, adjustable leg members, each adjustable leg member includes at least two adjustable feet which contact and conform to the grade.

It is highly preferable that the at least two adjustable feet are able to be adjusted independently of each other. The at least two adjustable feet are preferably able to be adjusted between a left side to right side direction as well as adjusted in a front-to-back direction so as to allow the two adjustable feet to conform to the grade. Preferably, the adjustable leg members each include one or more adjustment structures, the adjustment structures include a locking bolt, a first locking nut and a second locking nut.

Highly-preferred embodiments include at least two, opposing adjustable plates between the two adjustable feet and a brace member connected to the adjustable plate. Preferred embodiments include the adjustable plates each having one or more securement structures, the securement structures include both a bolt and at least one nut.

Preferably, the base includes top and bottom surfaces, the top surface having an opening to receive a dock leveler into such opening, the dock leveler including a lower end and an upper end, the upper end abutting a preexisting structure and the lower end including an lower edge having a lip, the lip being able to be activated between an extended/engaged position to contact a truck bed and a retracted/disengaged position.

In preferred embodiments, the modular loading dock also includes a housing with a modular frame mounted onto the base in sections, the sections include a frame-front wall, opposed frame-sidewalls and a frame-top wall, the frame-front wall has a vehicle-receiving opening to receive the back end of a vehicle.

In some preferred embodiments, the housing is secured to a wall of a building. It is also preferable that the base and housing are removable and able to be transported to different locations.

The term "impactable" as used herein refers to a base or frame which can withstand and transfer an impact load from a vehicle.

DETAILED DESCRIPTION OF PREFERRED EMBODIMENTS

Figure 1:
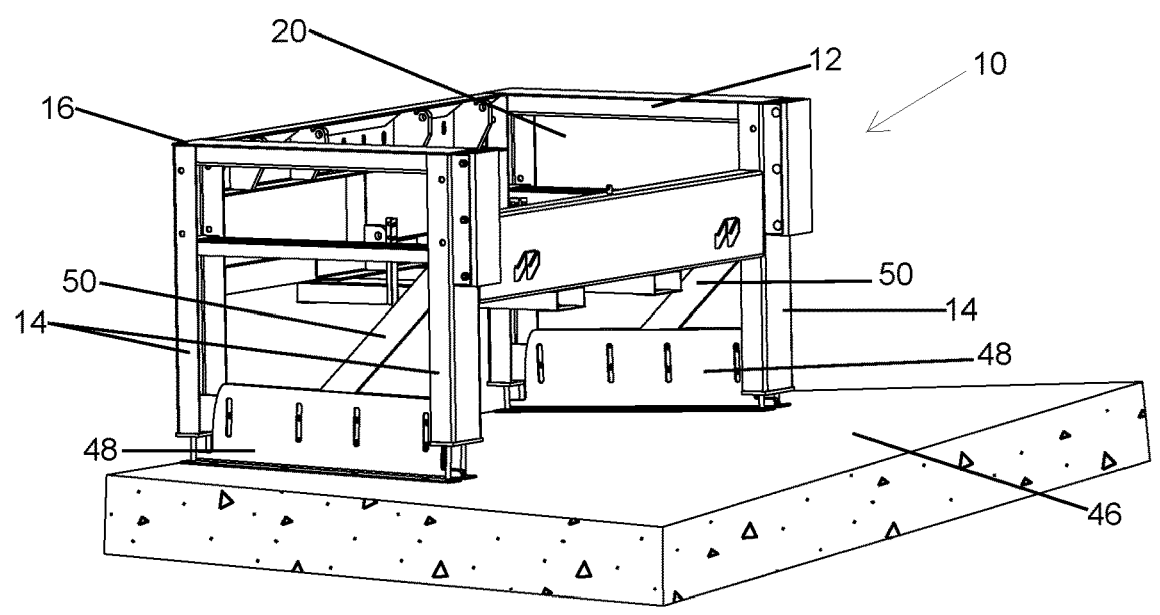
FIG. 1 is a side elevation of a modular loading dock.

FIGS. 1-10 illustrate a modular loading dock 10 with a mobile base 12. FIG. 1 illustrates that base 12 includes at least two but preferably four, opposing, adjustable leg members 14. Base 12 has both top and bottom surfaces 16, 18, with top surface 16 having an opening 20 to receive a dock leveler 58 into opening 20.

As seen best in FIG. 1, mobile base 12 has at least two, opposing adjustable plates 48, each plate 48 located between two adjustable feet 44. Each adjustable plate 48 includes one or more securement structures, the securement structures have a bolt 60 and at least one or two nuts 62 to secure bolt 60 in the desired position.

Figure 2:
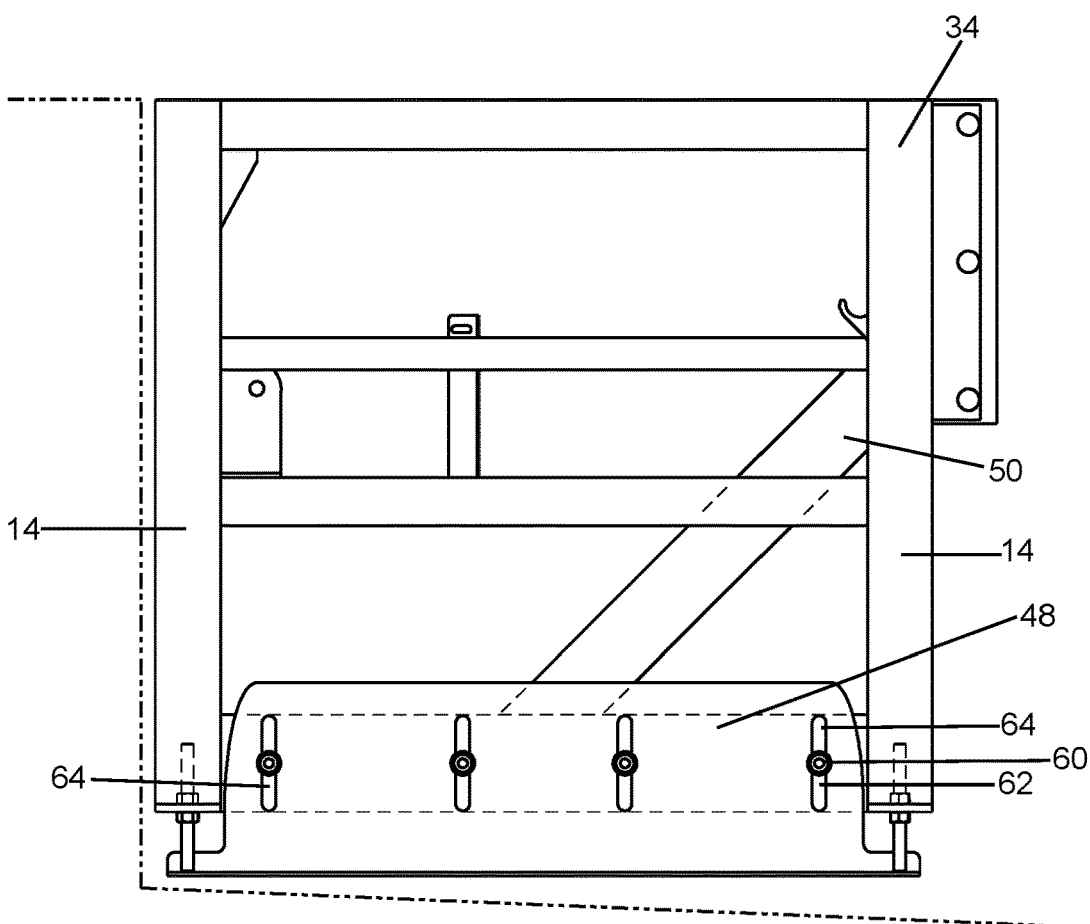
FIG. 2 is a side elevation illustrating base not conformed to the grade.
Figures 3, 4:
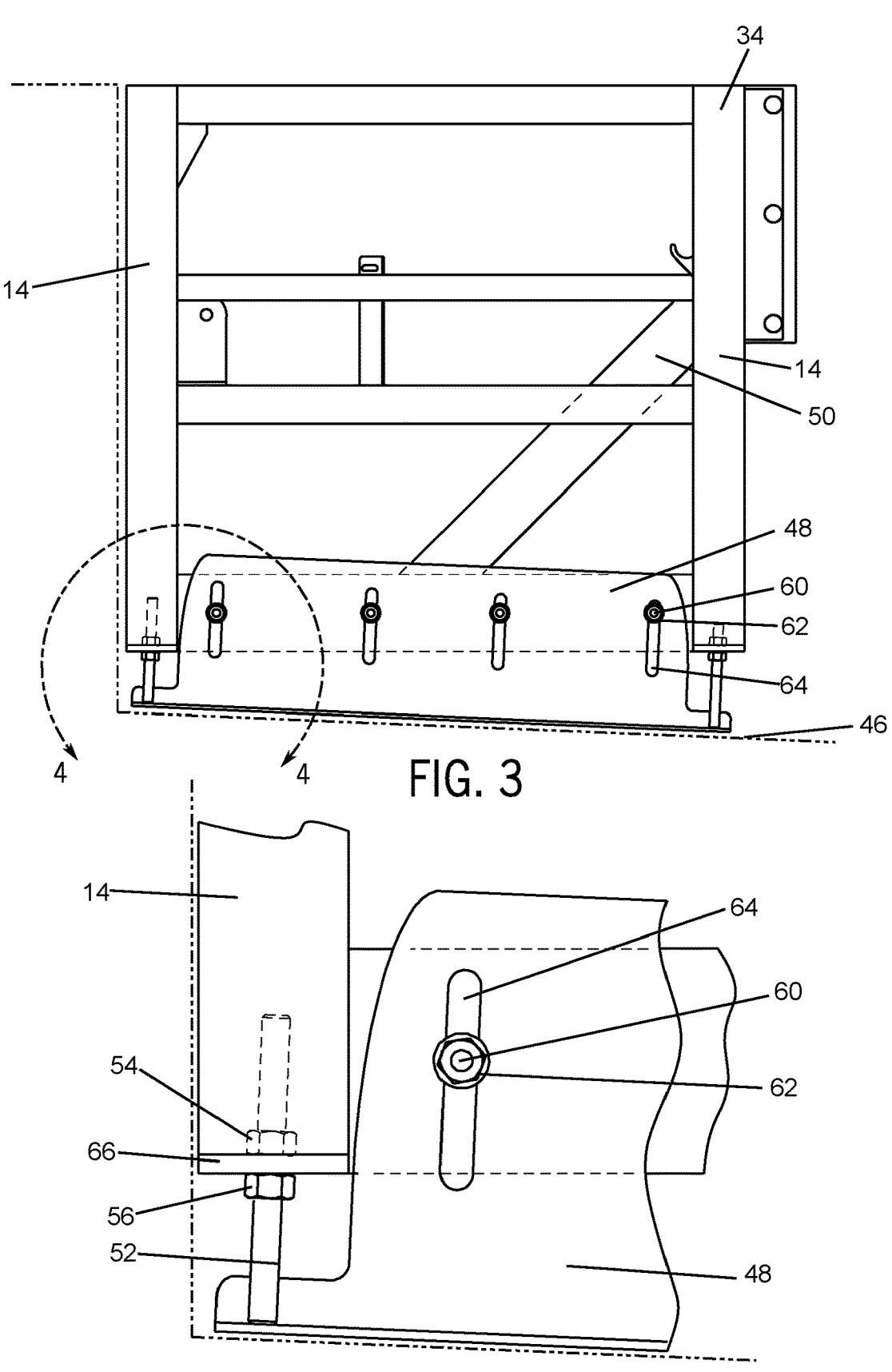
FIG. 3 is a side elevation illustrating base conformed to the grade.
FIG. 4 is a side view of an adjustable leg member and adjustable plate of FIG. 3 taken along line 4-4.

FIGS. 2-3 illustrate in detail how adjustable plate 48, through the use of bolt 60 and nut 62, can be adjusted. As seen best in FIGS. 2-3, adjustable plate 48 includes numerous slots which bolt 60 and nut 62 can slide in an upward and downward direction as needed to help adjustable plate 48 conform to the grade 46. Once adjustable plate 48 is in the desired position, bolt 60 and nut 62 are secured in place in slot 64 by tightening nut 62. Preferably, there are two nuts 62 one on each side of bolt 60. FIG. 2 illustrates adjustable plate 48 not conformed to grade 46. In contrast, FIG. 3, illustrates adjustable plate 48 conformed to grade 46.

FIGS. 2-3 illustrate that adjustable plate 48 also shifts with the grade 46. FIG. 2 illustrates adjustable plate 48 in a relatively horizontal position. In contrast, FIG. 3, illustrates that adjustable plate 48 is in an angled position (in a direction angled down to the right of the drawing) showing that adjustable plate 48 has conformed to grade 46 with adjustable feet 44. A brace member 50 is connected to adjustable plate 48 on one end and provides added strength to mobile base 12 as seen in FIGS. 2-3.

It is important to note that each side of base 12 has an adjustable plate 48 and that each adjustable plate 48 on either side of base 12 can be adjusted independent of the other adjustable plate 48 on the other side of base 12. Being able to adjust adjustable plate 48 to the exact contour of grade 46 allows for a more secure attachment to grade 46 and greater stability of base 12. This is also true of each of the four adjustable leg members 14. Each of the four adjustable leg members 14, which are part of base 12, can be adjusted independent of every other adjustable leg member 14.

Base 12 can be secured to any type of grade 36 including but not limited to gravel, asphalt or concrete. It is important to note that base 12 can secured to ground 36 by any known method and all such methods are within the scope of the application.

The adjustment of adjustable leg member 14 and adjustable plate 48 is seen in FIG. 4. FIG. 4 also illustrates in close up detail the interaction and adjustability of leg member 14 and adjustable plate 48. First locking nut 54 and second locking nut 56 are each located on locking bolt 52 as seen in FIG. 4. Locking bolt 52 goes through an opening in a lower end 66 of adjustable leg member 14 (see FIG. 4) so as to secure adjustable leg member 14 in the desired position.

Figure 5:
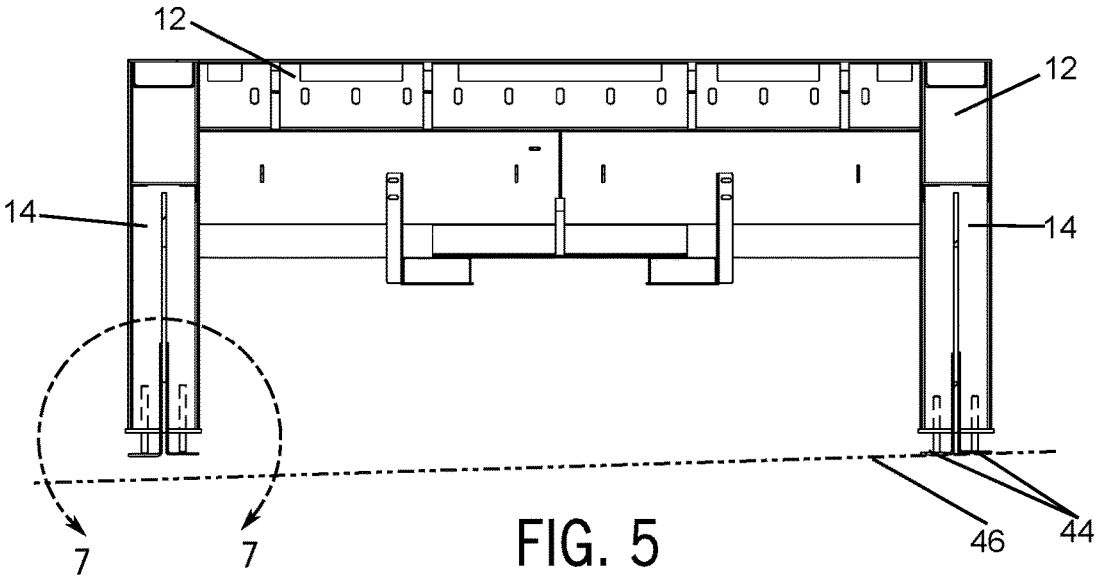
FIG. 5 is a front view illustrating base not conformed to the grade.
Figure 6:
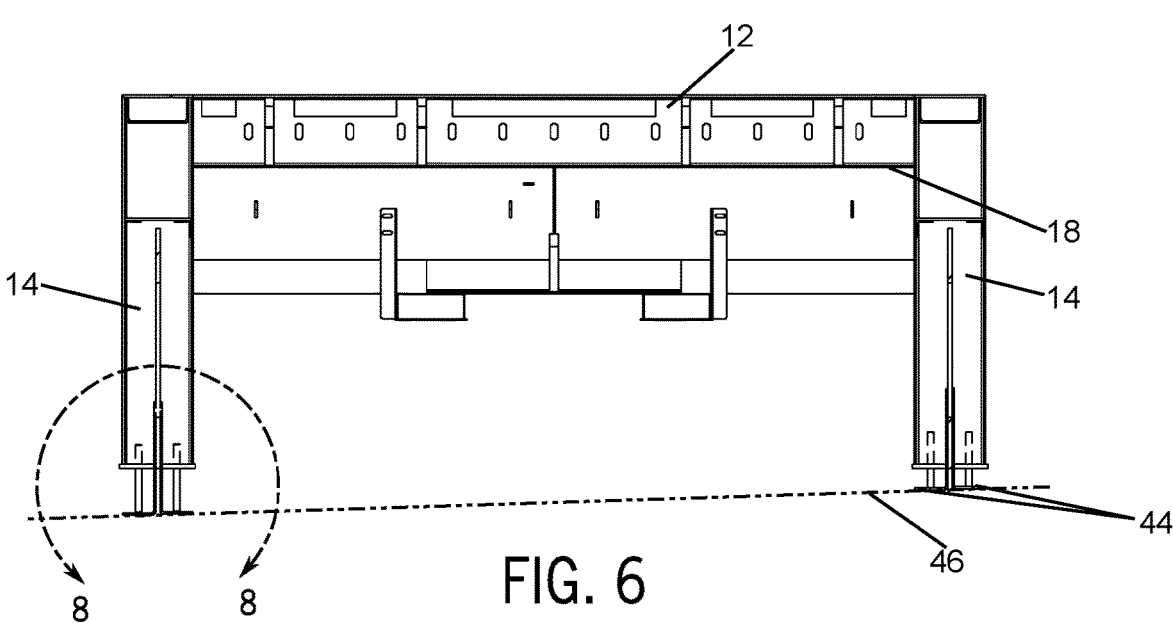
FIG. 6 is a front view illustrating base conformed to the grade.

Mobile base 12 with two of the four adjustable leg members are seen in FIGS. 5-6. FIG. 5 illustrates mobile base 12 not adjusted to grade 46, and in contrast, FIG. 6 shows mobile base 12 adjusted to grade 46. Specifically, in FIG. 6, adjustable feet 44 on each adjustable leg member 14 have been adjusted to conform to grade 46.

Figure 7:
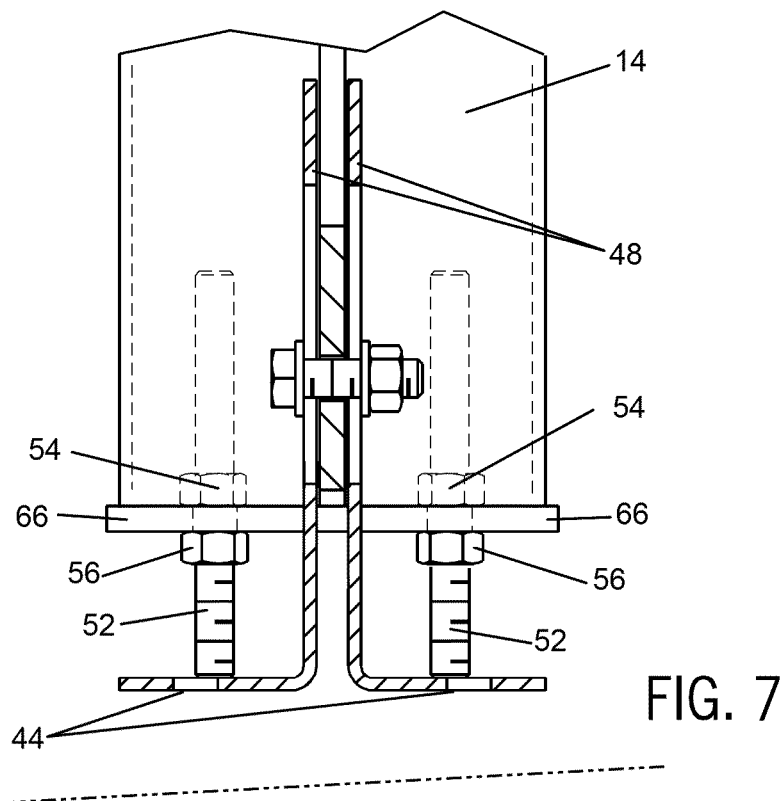
FIG. 7 is a sectional view of an adjustable leg member of FIG. 5 taken along line 7-7 illustrating leg member not conformed to the grade.
Figure 8:
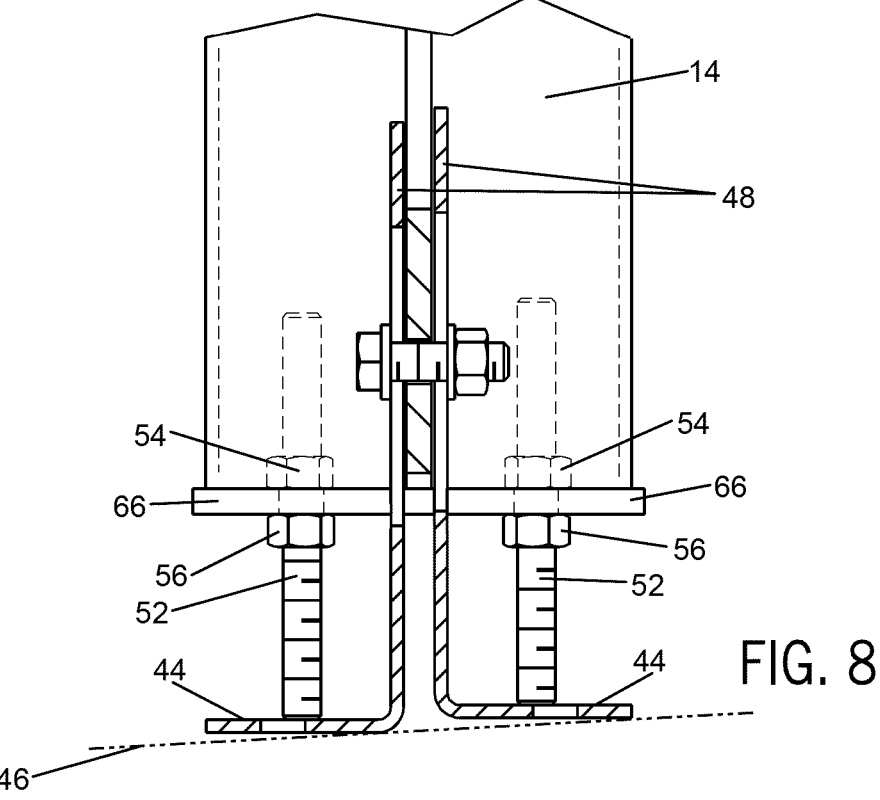
FIG. 8 is a sectional view of an adjustable leg member of FIG. 6 taken along line 8-8 illustrating leg member conformed to the grade.

FIGS. 7-8 illustrate adjustable leg member 14 in detail and that adjustable leg member 14 includes at least two adjustable feet 44 on each adjustable leg member 14. Adjustable feet 44 are able to contact and conform to the grade 46. FIG. 7 illustrates adjustable feet 44 not contacting the grade 46 which is fairly level. FIG. 8 illustrates how adjustable feet 44 can conform to the grade 46 when it is not level. As seen in FIG. 8, adjustable feet 44 are able to be adjusted independently of each other. In FIG. 8, the adjustable feet 44 shown are in different positions so as to securely contact the grade 46. Adjustable feet 44 are able to adjustable between a left side to right side direction as well as adjustable in a front-to-back direction so as to allow the each of the adjustable feet 44 to conform to the grade 46. Adjustable plate 48 has a portion of each end which is sandwiched between two adjustable feet which are located on adjustable leg member 14 as seen in FIGS. 7-8. A bolt with two nuts secures adjustable plate 48 in between two adjustable feet 44 as seen in FIGS. 7-8.

FIGS. 7-8 illustrate that adjustable leg members 14 include one or more adjustment structures, the adjustment structures include a locking bolt 52, a first locking nut 54 and a second locking nut 56. When first locking nut 54 and second locking nut 56 are loosened, the height of adjustable feet 44 can be changed so as to closely conform to grade 46.

Adjustable leg members 14 can be adjusted to conform to grade 46 by first loosening nuts 62 on each adjustable plate 48. Preferred embodiments of mobile base 12 will include two opposing adjustable plates 48. Nuts 62 must be loosened on each adjustable plate 48. Preferred embodiments include four adjustable leg members on each mobile base 12. Next, first locking nut 54 and second locking nut 56 on each of the four adjustable leg members 14 must be loosened. Loosening first locking nut 54 and second locking nut 56 allows the height of each of the adjustable feet 44 to be adjusted so that it contacts the grade 46. Each adjustable leg member 14 includes two adjustable feet 44. A mobile base will therefore, have eight adjustable feet 44 in all. Once each of the eight adjustable feet 44 are contacting the grade, first locking nut 54 and second locking nut 56 can be tightened on each adjustable leg member 14. At the same time each nut 62 on adjustable plate 48 can be tightened as well.

Figure 9:
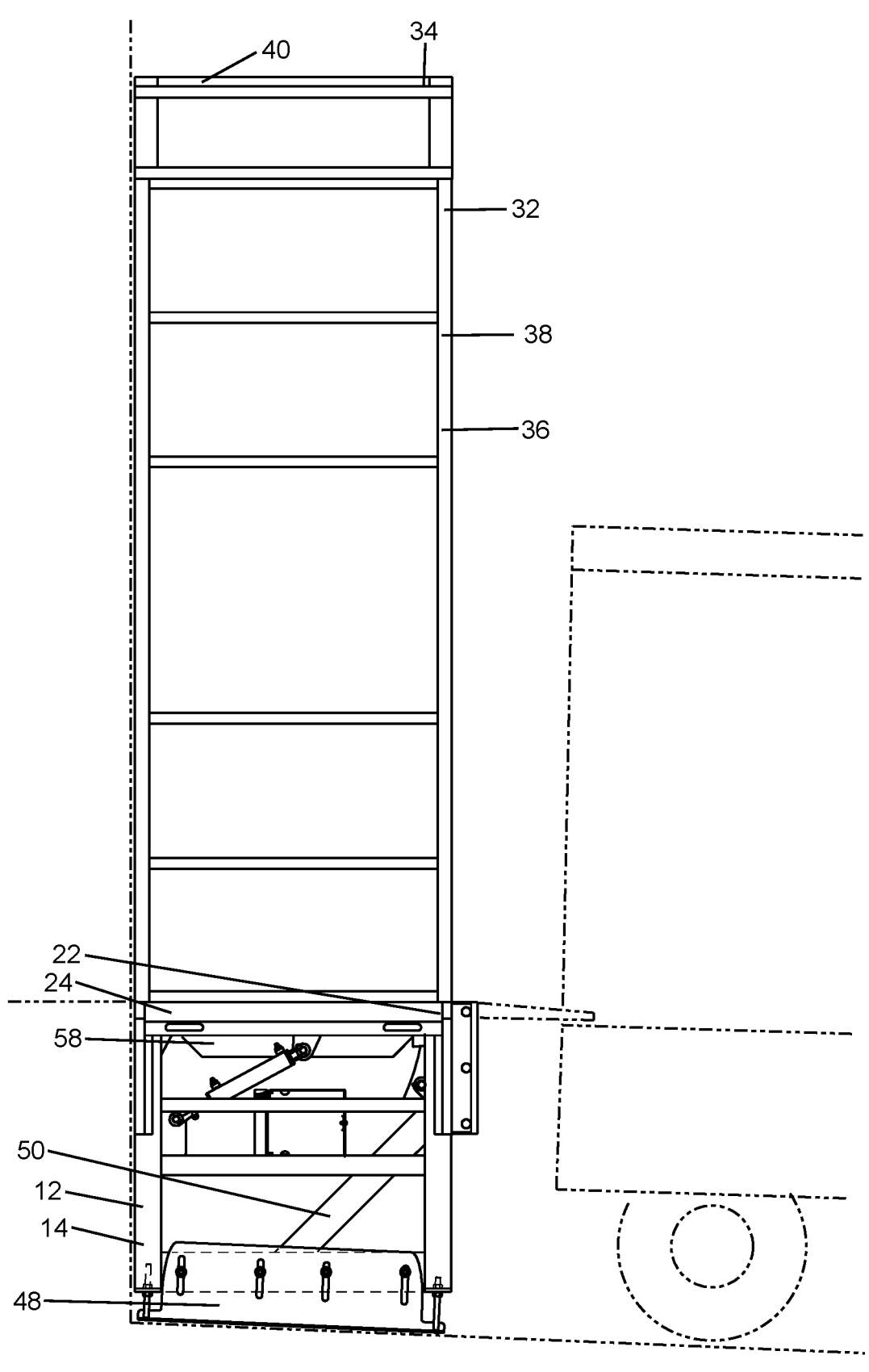
FIG. 9 is a side view of the base with the base adjusted to the grade and also including a housing.

The drawings also illustrate that dock leveler 58 has a lower end 22 and an upper end 24 as seen in best in FIG. 9. Upper end 24 abuts a preexisting structure 26 and lower end 24 includes a lower edge 28 which has a lip 30 as seen in FIG. 9. Lip 30 is able to be activated between an extended/engaged position to contact a truck bed and a retracted/disengaged position.

Figure 10:
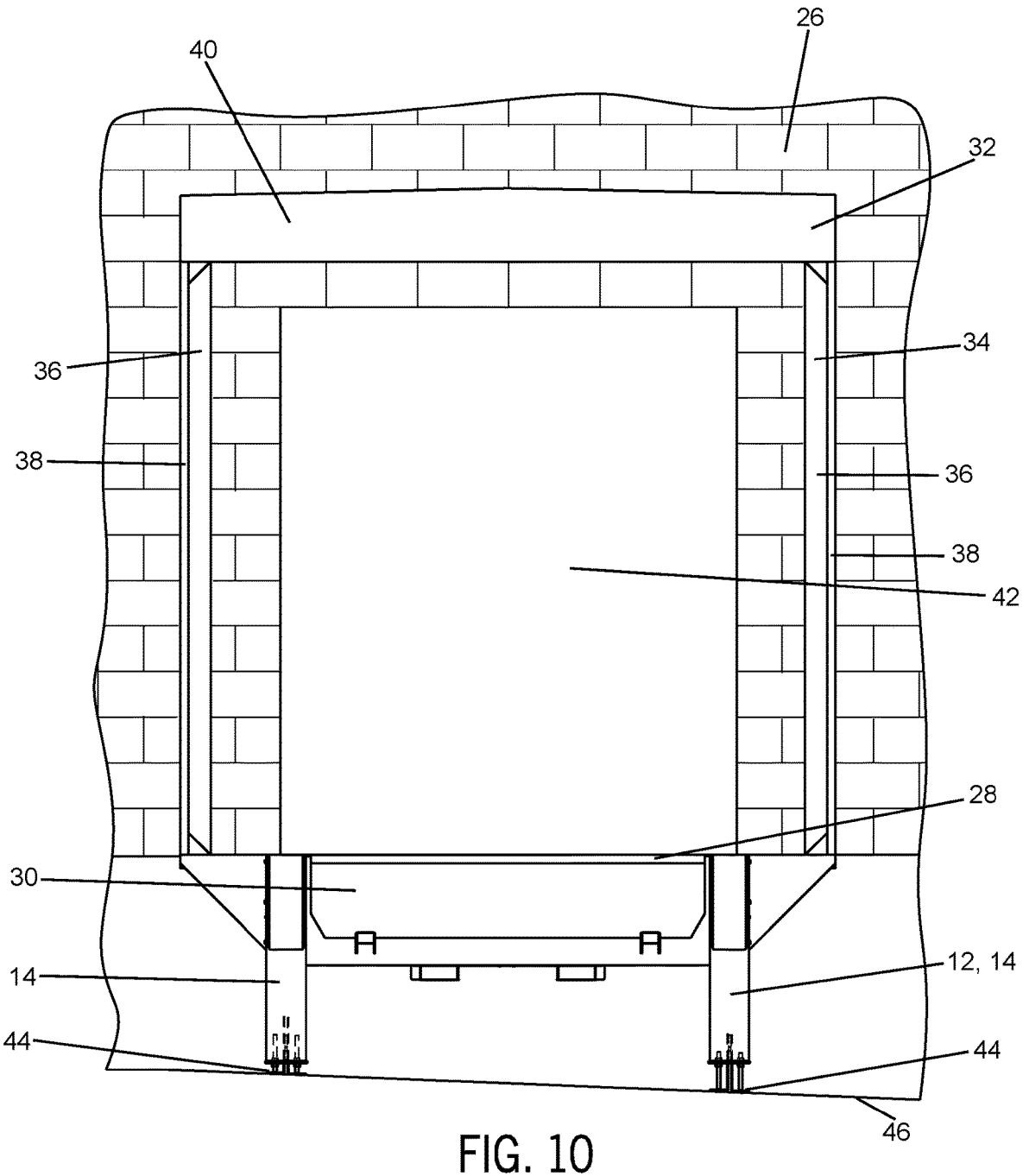
FIG. 10 is a perspective view a modular loading dock with the base and a housing.

FIGS. 9-10 illustrate that housing 32 includes modular frame 34 which is mounted onto base 12 in sections. These sections include a frame-front wall 36, opposed frame-sidewalls 38 and a frame-top wall 40, frame-front wall 36 has a vehicle-receiving opening 42 to receive a back end of a vehicle as illustrated in FIG. 9. Housing 32 can be secured to a wall of a pre-existing structure 26. (See FIG. 9.) Frame 34 is self-standing (it can operate as a stand-alone platform and does not need any other structure to function) but frame 34 is versatile as well as modular as it can also be used with any platform, ramp, dock housing or an existing building. Base 12 and housing 32 are removable and able to be transported to different locations.

A lifting system is incorporated into dock leveler 58. The hydraulic lifts assist in lifting a section of dock leveler 58. However, any other lifting systems known in the art could be utilized as well. A variety of dock levelers of different sizes and shapes can be used and are within the scope of this application Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A modular loading dock for placement on a grade, the loading dock comprising:

a mobile base having four adjustable leg members, each adjustable leg member including two adjustable feet which contact and conform to the grade, the four leg members defining a top opening to receive a dock leveler into such opening; and two pairs of opposing adjustable plates, each pair of opposing adjustable plates being connected between the two adjustable feet on two adjacent adjustable leg members such that each adjustable leg member is connected to only one pair of opposing adjustable plates.

2. The modular loading dock of claim 1 wherein the two adjustable feet on each leg member are independently adjustable.

3. The modular loading dock of claim 2 wherein the two adjustable feet are configured to adjust in a left side to right side direction as well as in a front-to-back direction so as to allow the two adjustable feet to conform to the grade.

4. The modular loading dock of claim 1 wherein the adjustable leg members include one or more adjustment structures, the adjustment structures having a locking bolt, a first locking nut and a second locking nut.

5. The modular loading dock of claim 1 further including a housing consisting of a modular frame mounted onto the mobile base in sections, such sections including a frame-front wall, opposed frame-sidewalls and a frame-top wall, the frame-front wall having a vehicle-receiving opening to receive a back end of a vehicle.

6. The modular loading dock of claim 5 wherein the housing is secured to a wall of a building.

7. The modular loading dock of claim 1 wherein the mobile base is removable and able to be transported to different locations.

* * * * *